United States Patent Office 3,334,096
Patented Aug. 1, 1967

3,334,096
ACID SALTS OF TERTIARYAMINOETHYL BETA - (1 - NAPHTHYL)-BETA-(2-TETRA-HYDROFURYL) ISOBUTYRATES
Etienne Szarvasi and Michel Bayssat, Lyon, France, assignors to Lipha, Lyonnaise Industrielle Pharmaceutique
No Drawing. Filed Mar. 18, 1964, Ser. No. 352,963
Claims priority, application France, Mar. 28, 1963, 929,519
6 Claims. (Cl. 260—247.2)

The present invention relates to new nitrogenous bases substituted by at least one naphthyl or naphthyl-methyl radical, and particularly to a new series of amino esters and amino ether oxides which are thus substituted and to a certain number of their derivatives and intermediate compounds in the preparation thereof.

The N-diethylamino ethyl beta-(1-naphthyl)-beta'-tetrahydrofuryl isobutyrate, endowed with antispasmodic properties, has formed the subject of the U.S. patent application Ser. No. 308,662 of Sept. 13, 1963.

Certain new amino esters and amino ether oxides, endowed with very interesting antispasmodic properties, have been discovered according to the invention. These compounds are the members of the class which consists in their free bases, their acid salts and their quaternary ammonium derivatives, of the compounds represented by the general formula:

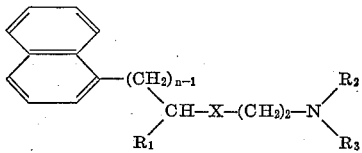

in which:

$n$ represents a positive integer at most equal to 2;
X is a member of the group consisting of the radicals —COO— and —CH$_2$O—;
R$_1$ is the tetrahydrofurfuryl radical when $n=2$, a propenyl radical when $n=1$ and X is the radical —COO—, and a non-saturated aliphatic radical containing 3 to 4 carbon atoms when X is the radical —CH$_2$O— and $n=1$;
R$_2$ represents a member of the group consisting of the lower alkyl radicals and the atoms necessary for completing in combination with R$_3$ and the adjacent nitrogen atom, a heterocyclic compound of the group consisting of piperidine, pyrrolidine and morpholine, except when the compound is a free base, X is the —COO— radical and $n=2$, R$_2$ then being simply the methyl radical;
R$_3$ is a member of the group consisting of the lower alkyl radicals and the atoms necessary for completing in combination with R$_2$ and the adjacent nitrogen atom, a heterocyclic compound of the group consisting of piperidine, pyrrolidine and morpholine.

The new compounds can be obtained according to the invention by condensation of a derivative of the formula

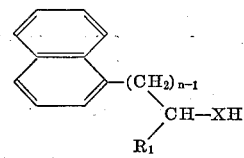

in which R$_1$ and X have the same meanings as before, with an amino derivative of the formula

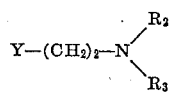

in which:

Y is a member of the group consisting of the halogens and the hydroxy radical;
R$_2$ and R$_3$ have the same meanings as above.

When X designates the —CH$_2$O— radical in the general formula of the compounds according to the invention, it is in addition possible to prepare the amino ether oxides of the formula

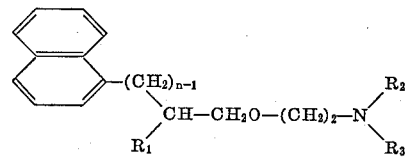

by condensation of the halogenoethylamino derivative of the formula

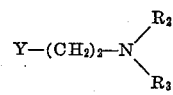

in which Y is a halogen, with the sodium derivative of the alcohol corresponding to the desired ether oxide, the latter preferably being obtained by the action of sodium amide on alcohol.

The disubstituted alcohols of the formula

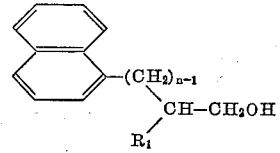

in which R$_1$ has the same meaning as above, capable of being more especially used as intermediate products in the obtaining of the new ether oxides, are new compounds, and in this capacity they form part of the invention. They are obtained by a process consisting in the reduction of an ester corresponding to the desired alcohol. According to a preferred modification, the aforesaid alcohols are prepared by reduction of a methyl ester by lithium-aluminum hydride in an inert solvent.

In the case where the symbol X of the general formula designates the —COO— radical, it is possible to prepare the amino esters of the formula

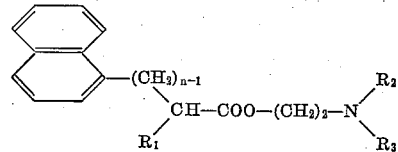

by esterification of an acid corresponding to the desired ester by the hydroxyethylamino derivative of the formula

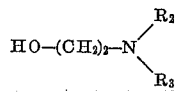

in which R$_2$ and R$_3$ have the same meanings as before. According to a preferred modification of the invention, the above amino esters are obtained by azeotropic esterification, consisting in heating together under reflux the acid and the hydroxyl derivative in the presence of an entraining agent for the water of esterification.

The acids used as initial products in the preparation of the above amino esters are described in U.S. patent application No. 174,684 of Feb. 21, 1962.

The mineral and organic acid salts of the new compounds according to the invention, such as the salts of phosphoric, oxalic and fumaric acids, are obtained by neutralisation, and the quaternary ammonium derivatives by reaction of an alkyl halide, particularly methyl iodide, with the corresponding amino esters and amino ether oxides, which thus constitute intermediate derivatives in the preparation of their derivatives.

In addition, the invention relates to an improved process for the preparation of N-diethylaminoethyl beta-(1-naphthyl)-beta'-tetrahydrofuryl isobutyrate, as well as the salts thereof.

Used in the Magnus test on the isolated intestine of a guinea pig, the new compounds according to the invention have an antispasmodic activity which is 10 to 40 times better than that of papaverine.

In the form of an addition salt, these compounds have a peripheral and coronary vasodilatory action which is comparable in very advantageous manner to that of the best products so far employed in this indication.

On the other hand, it is to be observed that the local anaesthetic activity of these derivatives is likewise very high, and this may reach 5 to 10 times that of diethylaminodimethyl-2,6-acetanilide hydrochloride.

The processes for the preparation and the physical constants of various compounds which form the subject of the present invention are hereinafter described as non-limitative examples.

*Example 1.—N-diethylaminoethyl beta-(1-naphthyl)-beta'-tetrahydrofuryl isobutyrate*

Empirical formula $C_{24}H_{33}NO_3$
Molecular weight $M=383.5$

Developed formula

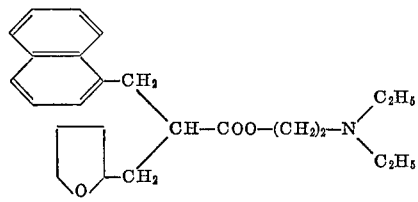

30 g. (0.106 mol) of beta-(1-naphthyl)-beta'-tetrahydrofuryl isobutyric acid are heated under reflux for 8½ hours in 230 cc. of isopropanol with 14 g. (0.103 mol) of beta-chloroethyl-N-diethylamine. After evaporation of the isopropanol in vacuo, the syrupy residue is treated with a solution of $K_2CO_3$. Extraction with ether is carried out after drying over $Na_2SO_4$. Distillation of the extract yields 28.5 g. of a very viscous yellow liquid with a boiling point $B.P._{0.95-1.09\ millibar}=198-202°$ C. The yield is 70.5% (theoretical quantity=40.5 g.).

*Example 2.—Acid oxalate of N-diethylaminoethyl beta-(1-naphthyl)-beta'-tetrahydrofuryl isobutyrate*

$C_{26}H_{35}NO_7$    $M=473.54$

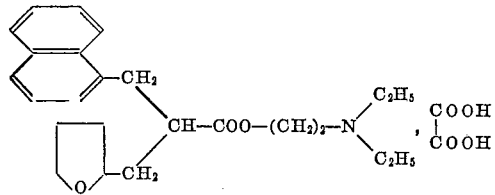

1.3 g. (0.0103 mol) of dihydrated oxalic acid are dissolved while being made tepid in 8 cc. of acetone. The cooled solution has added thereto 4 g. (0.0104 mol) of N-diethylaminoethyl beta-(1-naphthyl)-beta'-tetrahydrofuryl isobutyrate, obtained according to the process described in Example 1 and dissolved in 10 cc. of acetone. The solution is brought to boiling point for 15 minutes. After cooling to ambient temperature, it is placed in a refrigerator. Crystallisation occurs after 2 hours, the crystals which have formed are separated by centrifuging, and after washing in hexane and drying in vacuo, 3.5 g. of white crystals are obtained.

After being recrystallised three times, in alcohol and then in a mixture of alcohol and ethyl acetate, the product is analytically pure and has the following constants:

Melting point $(M.P.)=110-111°$ C. (heating stage).
Acidity index: Calculated=236. Found=235.
Gravimetric analysis.—Calculated: C, 65.95%; N, 2.95%; H, 7.45%. Found: C, 65.89%; N, 3.07%; H, 7.65%.

This same oxalate is obtained from the amino ester prepared in accordance with the azeotropic process. The structure of this oxalate is thus perfectly confirmed.

This same oxalate can be prepared from the undistilled base, freed from the polymer of the N-(beta-chloroethyl)-diethylamine, by being dissolved in an appropriate solvent (alcohol or ether), followed by filtration and evaporation of the solvent in vacuo.

The oxalate thus obtained can serve for obtaining the base: N-diethylaminoethyl beta-(1-naphthyl)-beta'-tetrahydrofuryl isobutyrate in a very pure form.

For this purpose, the following procedure is used:

25 g. (0.053 mol) of oxalate, in suspension in 100 cc. of water, are treated with 100 cc. of 30% sodium hydroxide solution.

The oily layer which is separated is extracted with benzene and dried over $Na_2SO_4$.

Distillation supplies:

13.7 g. of a light yellow oil with an amino odour.
$B.P._{0.35-0.4\ millibar}=185-187°$ C.

The product thus purified is employed in the preparation of its oxalate. The first fraction of the distillation is added to a crude base and is treated as above.

This procedure for the preparation of the amino ester is advantageous, because the direct distillation of the unpurified product by passing through the salt stage causes a slight decomposition during distillation.

The oxalate prepared from the purified base melts at 106–108° C. (heating stage).

The recrystallisation from alcohol causes a rise in its melting point to 108–109° C. (heating stage).

From this time, it has the purity required for subsequent uses.

When the amino ester is prepared by the azeotropic process, it can also be purified in advantageous manner by treatment of the crude product with a stoichiometric quantity of oxalic acid, followed by the freeing of the base, as above. The constants thereof are as follows:

$B.P._{0.5\ millibar}=190°$ C.
$n_d^{20}=1.556$
$d_4^{19.5}=1.064$.

*Example 3.—Acid fumarate of N-diethylaminoethyl beta-(1-naphthyl)-beta'-tetrahydrofuryl isobutyrate*

$C_{28}H_{37}NO_7$    $M=499.59$

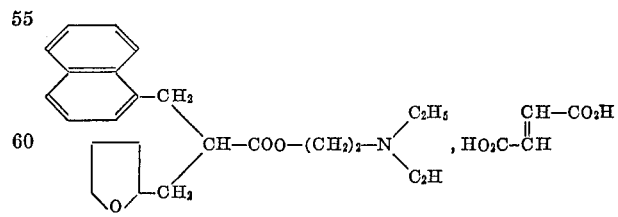

4 g. (0.0104 mol—3.8 g.=0.01 mol) of N-diethylamino ethyl beta-(1-naphthyl)-beta'-tetrahydrofuryl isobutyrate are dissolved in 10 cc. of ethanol, and a solution of 1.2 g. (0.01 mol=1.16 g.) of fumaric acid in 30 cc. of ethanol is added thereto.

The mixture is heated under reflux for 3 hours. The solution is concentrated to half its volume and ether is added. After cooling this solution overnight in a refrigerator, it precipitates an oil which is transformed by scratching into white crystals with a melting point of 60–90° C. (capillary tube).

After being recrystallised twice from a large excess of ethyl acetate, white crystals are obtained which have the following constants:

M.P.=87–89° C. (capillary tube).
Acidity index: Calculated=223. Found=225.
Gravimetric analysis.— Calculated: C, 67.31%; H, 7.47%; N, 2.80%. Found: C, 67.12%; H, 7.59%; N, 2.96%.

*Example 4.—N - dimethylaminoethyl beta-(1-naphthyl)-beta'-tetrahydrofuryl isobutyrate*

$C_{22}H_{29}NO_3$    M=355.46

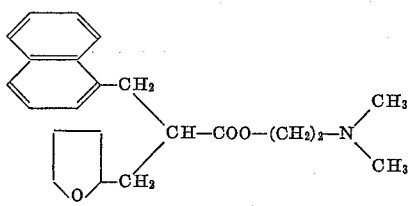

30 g. (0.106 mol) of beta-(1-naphthyl)-beta' tetrahydrofuryl isobutyric acid are treated in accordance with the conditions of Example 1 with 10.7 g. (0.10 mol) of beta-chloroethyl-N-dimethylamine.

Distillation yields 6.7 g. of a slightly coloured oil with a boiling point B.P._{1.09 millibar}=182–183° C., the yield being 19% (theoretical quantity=35.5 g.).

After redistillation, the product has the following constants:

Boiling point B.P._{0.68 millibar}=168–170° C.
Refractive index $n_d^{22.5}$=1.5655.

*Example 5.—Acid oxalate of N-dimethylaminoethyl beta-(1-naphthyl)-beta'-tetrahydrofuryl isobutyrate*

$C_{25}H_{33}NO_3$    M=395.52

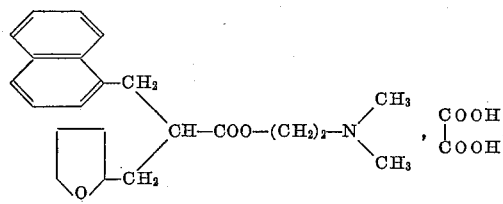

3.5 g. (~0.01 mol) of N-dimethylaminoethyl beta-(1-naphthyl)-beta'-tetrahydrofuryl isobutyrate are dissolved in 8 cc. of acetone and a solution of 1.3 g. (0.0103 mol) of dihydrated oxalic acid in 8 cc. of acetone is added thereto. As soon as the addition is completed, the expected salt precipitates. The usual treatment provides 2.8 g. of white crystals with a melting point of 131.5–133° C. (capillary tube). The yield cannot be established, the second discharge having been neglected.

Recrystallisation from a large excess of alcohol leaves the melting point unchanged.

The product has the following acidity index:
Acidity index: Calculated=251. Found=250.
Gravimetric analysis.—Calculated: C, 64.72%; H, 7.02%; N, 3.14%. Found: C, 64.86%; H, 6.88%; N, 3.10%.

*Example 6.—N-ethyl piperidine beta-(1-naphthyl)-beta'-tetrahydrofuryl isobutyrate*

$C_{25}H_{33}NO_3$    M=395.52

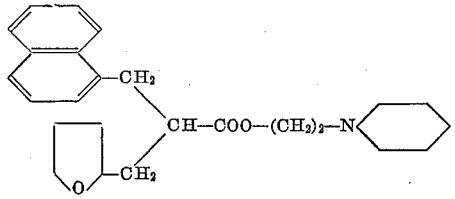

30 g. (0.106 mol) of beta-(1-naphthyl)-beta'-tetrahydrofuryl isobutyric acid are treated with 15 g. (0.10 mol) of N-(beta-chloroethyl)-piperidine under the conditions of Example 1.

Distillation yields 15 g. of a dark oil having a basic odor and a boiling point (B.P.)_{1.22 millibars}=206–209° C. The yield is 38% (theoretical quantity=39.5 g.).

With the second distillation, the product has the following constants:

Boiling point B.P._{2 millibars}=218–220° C.
Refractive index $n_d^{23}$=1.5670.

The distillation of the product is avoided later, the crude product of the reaction, freed from the polymer of the N-(beta-chloroethyl)-piperidine by filtration, being perfectly suitable for the preparation of salts.

*Example 7.—Acid oxalate of N-ethyl piperidine beta-(1-naphthyl)-beta'-tetrahydrofuryl isobutyrate*

$C_{27}H_{35}NO_7$    M=485.56

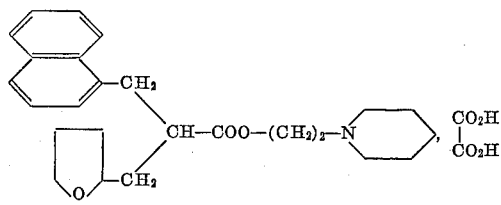

Following the procedure of Example 5, 3.95 g. (0.010 mol) of N-ethyl piperidine beta-(1-naphthyl)-beta'-tetrahydrofuryl isobutyrate are treated with the stoichiometric quantity of oxalic acid. The solution is brought to boiling point and the precipitate is formed on commencing the heating. Crystals having a melting point of 146.5–148.5° C. (capillary tube) are obtained with a practically quantitative yield.

After recrystallisation from a large excess of ethyl alcohol, the product is analytically pure and has the following constants:

Melting point (M.P.)=148–149° C. (capillary tube).
Acidity index: Calculated=230. Found=231.
Gravimetric analysis.—Calculated: C, 66.79%; H, 7.27%; N, 2.88%. Found: C, 67.02%; H, 7.09%; N, 2.97%.

*Example 8.—N-ethyl morpholine beta-(1-naphthyl)-beta'-tetrahydrofuryl isobutyrate*

$C_{24}H_{31}NO_4$    M=397.49

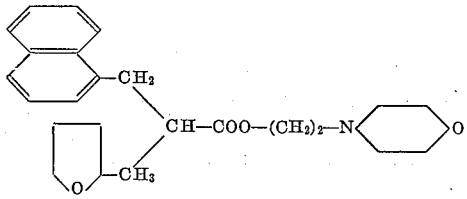

38 g. (0.133 mol) of beta-(1-naphthyl)-beta'-tetrahydrofuryl isobutyric acid, 450 cc. of dry xylene, 17.5 g. (≠0.133 mol) of N-(beta-hydroxyethyl)-morpholine and 0.5 g. of p-toluosulphonic acid are heated under reflux for 4 hours in an apparatus equipped with a Dean and Stark device. The crude product of the reaction is washed with a sodium bicarbonate solution.

The usual treatment supplies 10.5 g. of a yellow oil with a boiling point B.P._{1.36 millibars}=224° C. The yield is 20% (theoretical quantity=53 g.).

The redistilled product has the following constants:

Boiling point B.P._{0.95 millibar}=191–192° C.
Refractive index $n_d^{21.5}$=1.571.

*Example 9.—Acid oxalate of N-ethyl morpholine beta-(1-naphthyl)-beta'-tetrahydrofuryl isobutyrate*

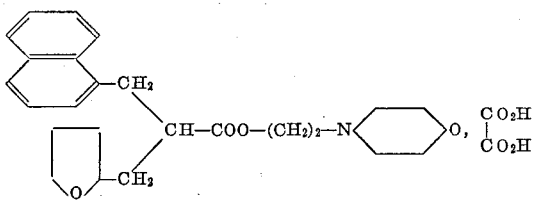

4 g. (0.01 mol=3.97 g.) of N-ethyl morpholine beta-(1-naphthyl)-beta'-tetrahydrofuryl isobutyrate are treated with the stoichiometric quantity of dihydrated oxalic acid under the conditions of Example 5.

The reaction takes place in the cold and the salt precipitates as soon as the addition of the acid is completed. 4 g. of white crystals are obtained with a melting point of 132–134° C. (capillary tube). The yield is 82.5% (theoretical quantity=4.87 g.).

After recrystallisation from ethyl alcohol, the product is analytically pure and has the following constants:
M.P.=133–135° C. (capillary tube).
Acidity index: Calculated=229. Found=230.
Gravimetric analysis.—Calculated: C, 64.05%; H, 6.82%; N, 2.87%. Found: C, 64.34%; H, 6.27%; N, 2.95%.

*Example 10.—Acid oxalate of N-dimethylaminoethyl alpha-(1-naphthyl)-delta-pent-4-enoate*

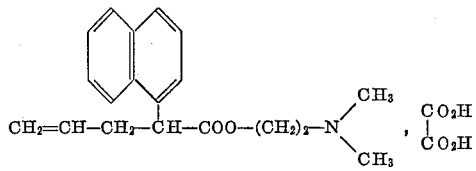

Following the conditions of Example 11, 7 g. (0.0227 mol) of dimethylaminoethyl alpha-(1-naphthyl)-delta-pent-4-enoate, obtained for example by azeotropic esterification in toluene of alpha-(1-naphthyl)-delta-pent-4-enoic acid, are caused to react with 2.97 g. (0.023 mol) of dihydrated oxalic acid.

7.6 g. of white solid are obtained, the yield being 80% (theoretical quantity=9.5 g.).

After having been recrystallised twice from a mixture of ethyl acetate and alcohol, the product is analytically pure and has the following constants:
Melting point (M.P.)=164–165° C. (capillary tube); 157–159° C. (with capillary tube in a Gallenkamp apparatus).
Acidity index: Calculated=289. Found=286.
Gravimetric analysis.—Calculated: C, 65.10%; H, 6.50%; N, 3.61%. Found: C, 65.02%; H, 6.62%; N, 3.64%.

*Example 11.—Acid oxalate of N-diethylaminoethyl alpha-(1-naphthyl)-delta-pent-4-enoate*

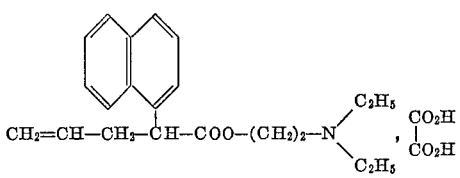

5 g. (0.0152 mol) of N-diethylaminoethyl alpha-(1-naphthyl)-delta-pent-4-enoate, obtained for example by the action of beta-chloroethyl-N-diethylamine on alpha-(1-naphthyl)-delta-pent-4-enoic acid, are caused to react with 2 g. (0.0152 mol=1.93 g.) of dihydrated oxalic acid, under the conditions of Example 5.

5.5 g. of crystals are obtained with a melting point of 108–110° C. (capillary tube).

After being recrystallised three times from a mixture of ethyl acetate and alcohol, the product is analytically pure and has the following constants:
M.P.=122–124° C. (capillary tube).
Acidity index: Calculated=269. Found=265.
Gravimetric analysis.—Calculated: C, 66.51%; H, 7.63%; N, 3.37%. Found: C, 65.92%; H, 6.90%; N, 3.36%.

*Example 12.—Beta-(1-naphthyl)-beta'-tetrahydrofuryl-1-isobutanol*

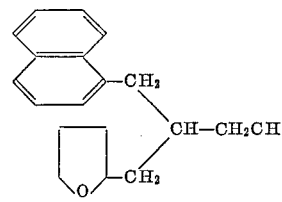

14 g. (0.37 mol) of $LiAlH_4$ and 1600 cc. of dry ether are placed in a spherical flask equipped with a mechanical stirrer device, a reflux condenser and a dropping funnel. 120 g. (0.41 mol) of methyl-beta-(1-naphthyl)-beta'-tetrahydrofuryl isobutyrate in solution in 120 cc. of ether are introduced dropwise into the flask by means of the dropping funnel.

The speed of addition is regulated in such a way that the ether is caused to boil gently. The duration of the addition is 1 hour 25 minutes. The yellow mixture is heated under reflux for 4 hours. The complex which forms is decomposed by carefully adding dropwise 320 cc. of water and then 600 cc. of 10% $H_2SO_4$.

After extraction with ether and drying the extract over $Na_2SO_4$, distillation yields 89 g. of viscous yellow liquid with a $B.P._{0.95\ millibar}$=184–185° C. The yield is 82% (theoretical quantity=108.5 g.).

The redistilled product is analytically pure and has the following constants:
$B.P._{0.816\ millibar}$=179° C.
Refractive index $n_d^{24.5}$=1.595.
Acidity index: Calculated=207. Found=211.
Gravimetric analysis.—Calculated: C, 79.96%; H, 8.20%. Found: C, 79.95%; H, 7.95%.

*Beta-(1-naphthyl)-beta'-tetrahydrofuryl isobutanol phenyl urethane*

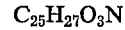

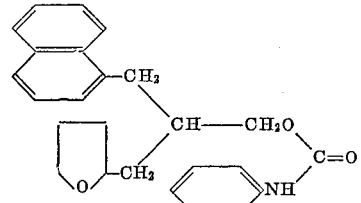

Melting point=108–110° C. After recrystallisation from carbon tetrachloride, the product is analytically pure.

Gravimetric analysis.—Calculated: N, 3.60%. Found: N, 3.65%.

*Example 13.—N-dimethylaminoethoxy-beta-(1-naphthyl)-beta'-tetrahydrofuryl isobutane*

$C_{22}H_{31}NO_2$   M=341.47

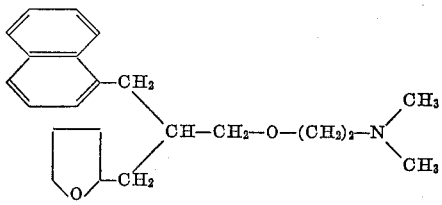

250 cc. of anhydrous benzene, 4 g. (0.10 mol=3.9 g.) of 95% sodium amide, 27 g. (0.10 mol) of beta-(1-naphthyl)-beta'-tetrahydrofuryl-1-isobutanol are placed in a dry apparatus, heated under reflux for 1 hour, and after cooling, 11 g. (0.10 mol=10.7 g.) of N-[beta-chloroethyl]-dimethylamine are added.

After heating under reflux for 16 hours, the reaction mixture is treated with water and the organic layer extracted with benzene. The distillation of the extract yields 25 g. of a fairly clear liquid with a $B.P._{0.49\ millibar}=166-168°\ C.$ The yield is 73.5% (theoretical quantity=34.1 g.).

*Example 14.—N - dimethylaminoethoxy - beta - (1-naphthyl)-beta'-tetrahydrofuryl isobutane methiodide*

$C_{23}H_{34}INO_2$   M=483.43

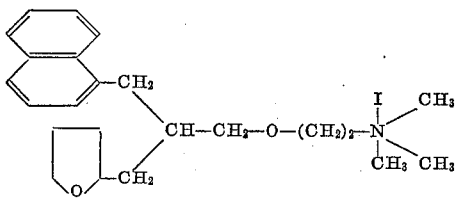

7 g. (0.0203 mol) of N-dimethylaminoethoxy-beta-(1-naphthyl)-beta'-tetrahydrofuryl isobutane are dissolved in 7 cc. of alcohol and 3 g. (0.021 mol) of methyl iodide are added dropwise thereto. A slight heating of the liquid is found and the addition of ether causes the precipitation of an oil which solidifies after 3 hours at ambient temperature. The centrifuging of the crystalline product, effected after having been in the refrigerator for 48 hours, yields 8 g. of crystals. The yield is 80%

(theoretical quantity=9.95 g.)

After having been recrystallised four times from a large excess of alcohol, the melting point is 153–155° C. (tube).

Gravimetric analysis.—Calculated: C, 57.15%; H, 7.09%; N, 2.90%. Found: C, 56.78%; H, 6.80%; N, 2.99%.

*Example 15.—Acid oxalate of N-dimethylaminoethoxy-beta-(1-naphthyl)-beta'-tetrahydrofuryl isobutane*

$C_{24}H_{33}NO_6$   M=431.51

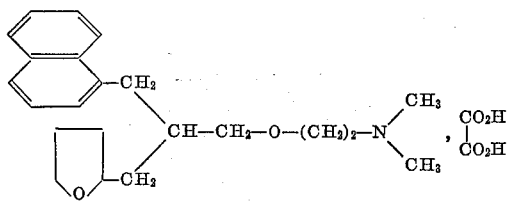

As in Example 5, 10.5 g. (0.034 mol) of N-dimethylaminoethoxy-beta-(1-naphthyl)-beta'-tetrahydrofuryl isobutane are treated with the stoichiometric quantity of oxalic acid. The reaction mixture is heated under reflux for 15 minutes. After cooling 35 cc. of hexane are added thereto. The crystallisation of the mixture yields 8 g. of white crystals with a melting point of 76–78° C. (capillary tube). The yield is 60.0% (theoretical quantity=13.2 g.).

After recrystallisation from a mixture of ethyl acetate and alcohol, an analytically pure product is obtained which has the following constants:

M.P.=77–79° C. (capillary tube).
Acidity index: Calculated=259. Found=247.
Gravimetric analysis.—Calculated: C, 66.80%; H, 7.71%; N, 3.24%. Found: C, 66.93%; H, 7.36%; N, 3.43%.

*Example 16.—N-diethylaminoethoxy -[beta-(1-naphthyl)-beta'-tetrahydrofuryl]-isobutane*

$C_{24}H_{35}NO_2$   M=369.52

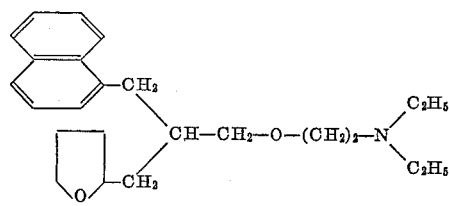

230 cc. of dry benzene and 4 g. (0.10 mol=3.9 g.) of 95% sodium amide are placed in a dry spherical flask equipped with a mechanical stirrer and dropping funnel. 27 g. (0.10 mol) of beta-(1-naphthyl)-beta'-tetrahydrofuryl-1-isobutanol are introduced thereinto. Heating under reflux takes place for 1 hour, the mixture becoming brown. After cooling, 13.5 g. (0.10 mol) of beta-chloroethyl-N-diethylamine are added dropwise.

Heating under reflux takes place for 16 hours. The excess sodium amide is destroyed by adding an equal volume of water and the organic layer is extracted with benzene. After drying over sodium sulphate, the distillation of the extract yields 28.5 g. of a yellow oily product which has an amino odour and a $B.P._{0.57\ millibar}=169-171°\ C.$ The yield is 77% (theoretical quantity=36.9 g.). The redistilled product has the following constants:

$B.P._{0.408\ millibar}=160°\ C.$
Refractive index $n_d^{25}=1.5583$
Density $d_4^{20}=1.014$ It is analysed in the methiodide form.

*Example 17.—N-diethylaminoethoxy-[beta-(1-naphthyl)-beta'-tetrahydrofuryl]-isobutane methiodide*

$C_{25}H_{38}NO_2I$   M=511.48

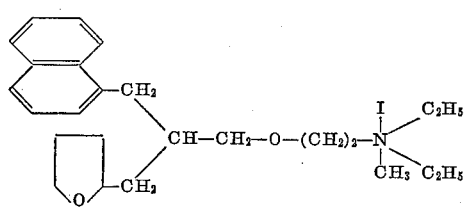

7.4 g. (0.02 mol) of N-diethylaminoethoxy-[beta-(1-naphthyl)-beta'-tetrahydrofuryl]-isobutane are dissolved in 8 cc. of alcohol and 3 g. (0.021 mol) of methyl iodide are added dropwise thereto. After the exothermic reaction has ceased, 100 cc. of dry ether are added to the mixture.

An oil is precipitated which is quickly changed, after scratching with a glass rod, into a white crystalline mass. The solid is centrifuged after standing overnight in a refrigerator, it is washed with ether and dried over $P_2O_5$ in vacuo. 9 g. of white crystals are obtained with a melting point of 66–70° C. (capillary tube). The yield is 88% (theoretical quantity=10.2 g.).

After being recrystallised twice (alcohol-ether and then alcohol by itself), the product is analytically pure, melting at 89–91° C. (capillary tube).

The product is slightly hygroscopic. After having been left standing in air for some time, it melts sharply at 72–74° C.

Gravimetric analysis.—Calculated: C, 58.71%; H, 7.49%; I, 24.82%. Found: C, 58.63%; H, 7.36%; I, 24.93%.

*Example 18.—N-piperidinoethoxy-[beta-(1-naphthyl)-beta'-tetrahydrofuryl]isobutane*

$C_{25}H_{35}NO_2$    M=381.53

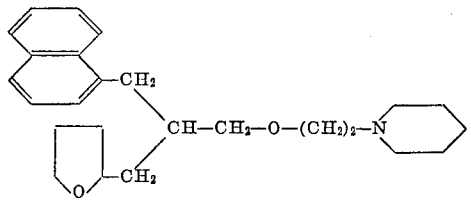

27 g. (0.10 mol) of beta-(1-naphthyl)-beta'-tetrahydrofuryl-1-isobutanol are treated under the conditions of Example 16 with 15 g. (0.10 mol=14.8 g.) of N-(beta-chloroethyl)-piperidine.

Distillation supplies 28 g. of a viscous liquid having a $B.P._{0.68-0.816\ millibar}=190-192°$ C. The yield is 73.5% (theoretical quantity=38.1 g.).

The redistilled product has the following constants:

$B.P._{0.545\ millibar}=191-193°$ C.
Refractive index $n_d^{20.5}=1.564$

It is analysed in the form of its phosphate.

*Example 19.—N-piperidinoethoxy-[beta-(1-naphthyl)-beta'-tetrahydrofuryl]-isobutane phosphate*

$C_{25}H_{38}NO_6P$    M=479.54

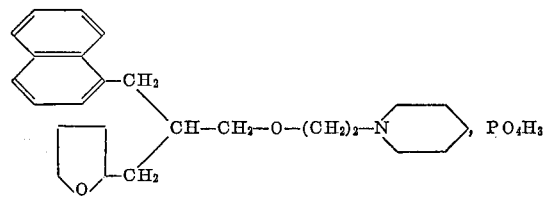

3.8 g. (0.01 mol) of N-piperidinoethoxy-[beta-(1-naphthyl)-beta'-tetrahydrofuryl]-isobutane are dissolved in 10 cc. of isopropanol and 1.2 g. (0.019 mol=1.17 g.) of 85% orthophosphoric acid are added dropwise to the solution. The isopropanol is evaporated in vacuo and the viscous residue is taken up in 14 cc. of hot alcohol. The recrystallisation takes place after standing overnight. After washing the solid with ether and drying in vacuo, there are obtained 4 g. of crystals having a melting point of 126° C. (capillary tube). The yield is 83% (theoretical quantity=4.8 g.).

After recrystallisation from alcohol, the product is analytically pure. Melting point=130–132° C. (capillary tube).

Gravimetric analysis.—Calculated: C, 62.62%; H, 7.99%; N, 2.92%. Found: C, 62.58%; H, 7.79%; N, 3.00%.

*Example 20.—N-(beta-ethoxymorpholine)-beta-tetrahydrofuryl-beta'-(1-naphthyl)-isobutane*

$C_{24}H_{33}NO_3$    M=383.51

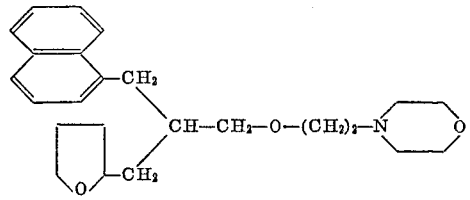

27 g. (0.10 mol) of beta-(1-naphthyl)-beta'-tetrahydrofuryl-1-isobutanol are treated with 23 g. (0.155 mol) of N-(beta-chloroethyl)-morpholine, in the presence of dry toluene as solvent, under the conditions of Example 19. By distillation, there are obtained 25 g. of a yellow oil having a faint odor and a $B.P._{1.09\ millibar}=205-207°$ C., and a refractive index $n_d^{24}=1.567$. The yield is 65.5% (theoretical quantity=38.3 g.).

*Example 21.—Acid oxalate of N-(beta-ethoxymorpholino)-beta-tetrahydrofuryl-beta'-(1-naphthyl)isobutane*

$C_{26}H_{35}NO_7$    M=473.55

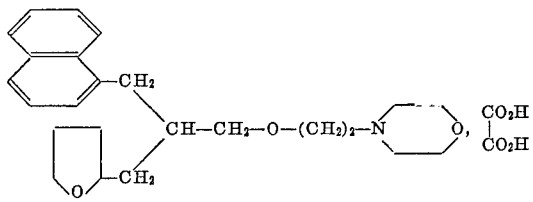

3.8 g. (0.010 mol) of N-(beta-ethoxymorpholino)-beta-tetrahydrofuryl-beta'-(1 - naphthyl) - isobutane are treated with 1.3 g. (0.0103 mol) of dihydrated oxalic acid under the conditions of Example 5 and there are obtained 3.9 g. of white crystals with a melting point of 84–86° C. (capillary tube). The yield is 83% (theoretical quantity 4.7 g.).

Recrystallisation in ethyl acetate does not alter the melting point.

The acidity index of the product is as follows:
Acidity index: Calculated=236. Found=231.

Gravimetric analysis.—Calculated: C, 65.94%; H, 7.45%; N, 2.96%. Found: C, 66.03%; H, 7.29%; N, 2.89%.

*Example 22.—Alpha-(1-naphthyl)-delta-hex-4-en-1-ol*

$C_{16}H_{18}O$    M=226.30

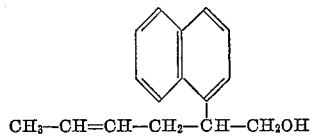

3.5 g. (0.095 mol) of lithium-aluminium hydride and 400 cc. of anhydrous ether are placed in a fluid-tight and dry apparatus and 25.5 g. (0.10 mol) of methyl-alpha-(1-naphthyl)-hexenoate in 50 cc. of anhydrous ether are introduced dropwise thereinto by means of a dropping funnel. The speed of addition is regulated in such manner that the ether is caused to boil gently. The duration of the addition is 40 minutes. The mixture is heated under reflux for 2 hours. The decomposition of the complex is effected by adding 80 cc. of water and then 150 cc. of 10% $H_2SO_4$.

The ethereal layer is dried and then distilled, and the desired product is obtained in the form of a light yellow liquid, with a quantitative yield.

The product has the following constants:

$B.P._{1.36\ millibar}=136°$ C.
Refractive index $n_d^{21}=1.604$.
Density=$d_4^{21.5}=1.0493$.
Acidity index: Calculated=247. Found=237.

Gravimetric analysis.—Calculated: C, 84.92%; H, 8.01%. Found: C, 84.86%; H, 7.86%.

*Phenyl urethane*

$C_{23}H_{23}NO_2$    M=345.41

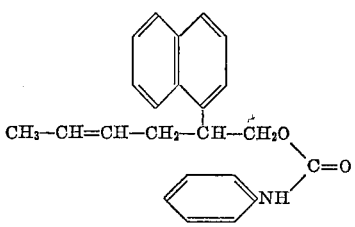

10 g. of the product as obtained above are added to 5 g. of phenyl isocyanate. The liquid is heated and the exothermic reaction lasts about 10 minutes. After standing overnight, a white slightly pasty solid is isolated, and this is recrystallised from 60 cc. of carbon tetrachloride. 6.5 g. of white crystals are obtained, with a melting point of 75–77° C. (heating stage).

Gravimetric analysis.—Calculated: C, 79.98%; H, 6.71%; N, 4.66%. Found: C, 79.44%; H, 6.77%; N, 4.03%.

*Example 23.—N-diethylaminoethoxy-alpha-(1-naphthyl)-delta-hex-4-ene*

$$C_{22}H_{31}NO \qquad M=325.47$$

$$CH_3-CH=CH-CH_2-CH-CH_2-O-(CH_2)_2-N\begin{matrix}C_2H_5\\C_2H_5\end{matrix}$$

690 cc. of dry benzene and 12 g. (0.3 mol=11.7 g.) of 97% sodium amide are placed in a dry apparatus and 69 g. (0.3 mol) of alpha-(1-naphthyl)-delta-hex-4-en-1-ol are introduced thereinto dropwise. The mixture is heated under reflux for 1 hour. As soon as the heating commences, liberation of ammonia is observed.

After cooling to normal temperature, 40.5 g. (0.3 mol) of beta-chloroethyl-N-diethylamine are introduced dropwise. The mixture is heated under reflux for 16 hours. After heating for 5 minutes, a precipitate appears. When the reaction is terminated, water is added to the reaction mixture and then the organic layer, previously dried, is distilled. 71 g. of a clear yellow liquid are obtained, this liquid distilling at 158–160° C. under a pressure of 0.75 millibar. The yield is 73% (theoretical quantity=97.5 g.).

The redistilled product is analytically pure and has the following constants:

B.P.$_{0.367\ millibar}$=145.5–146.5° C.
Refractive index $n_d^{23}$=1.552.
$d_4^{23}$=0.957.

Gravimetric analysis.—Calculated: C, 81.21%; H, 9.60%; N, 4.30%. Found: C, 81.25%; H, 9.51%; N, 4.33%.

*Example 24.—N-diethylaminoethoxy-alpha-(1-naphthyl)-delta-hex-4-ene methiodide*

$$C_{23}H_{34}INO \qquad M=467.42$$

$$CH_3-CH=CH-CH_2-CH-CH_2-O-(CH_2)_2-N^{+}\begin{matrix}I^{-}\ C_2H_5\\CH_3\ C_2H_5\end{matrix}$$

16.2 g. (0.05 mol) of N-diethylaminoethoxy-alpha-(1-naphthyl)-delta-hex-4-ene are treated with 7 g. (0.05 mol) of methyl iodide under the conditions set out in Example 20. The product crystallises slowly in a refrigerator and there are obtained 16 g. of slightly pasty white crystals. The yield is 69% (theoretical quantity=23.2 g.).

After having been recrystallised twice (alcohol-ether), the product is analytically pure and it has a melting point of 80–82° C. (capillary tube). It is slightly hygroscopic.

Gravimetric analysis.—Calculated: C, 59.10%; H, 7.33%; N, 2.99%. Found: C, 59.67%; H, 7.34%; N, 2.88%.

*Example 25.—N-dimethylaminoethoxy-alpha-(1-naphthyl)-delta-hex-4-ene*

$$C_{20}H_{27}NO \qquad M=297.42$$

$$CH_3-CH=CH-CH_2-CH-CH_2-O-(CH_2)_2-N\begin{matrix}CH_3\\CH_3\end{matrix}$$

23 g. (0.10 mol) of alpha-(1-naphthyl)-delta-hex-4-en-1-ol are treated with 11 g. (0.10 mol) of beta-chloroethyldimethylamine according to Example 21. Distillation yields 22 g. of viscous yellow liquid having a B.P.$_{0.816\ millibar}$=147–148° C.

The yield is 74% (theoretical quantity=29.7 g.).

The redistilled product is analytically pure, is practically colorless and it has the following constants:

B.P.$_{0.65\ millibar}$=143–143.5° C.
$n_d^{23}$=1.573.
$d_4^{22}$=0.989.

It is identified by the analysis of its methiodide.

*Example 26.—N-dimethylaminoethoxy-alpha-(1-naphthyl)-delta-hex-4-ene methiodide*

$$C_{21}H_{30}INO \qquad M=439.37$$

$$CH_3-CH=CH-CH_2-CH-CH_2-O-(CH_2)_2-N^{+}\begin{matrix}I^{-}\ CH_3\\CH_3\ CH_3\end{matrix}$$

8 g. (0.027 mol) of N-dimethylaminoethoxy-alpha-(1-naphthyl)-delta-hex-4-ene are treated with 4 g. (0.028 mol) of methyl iodide under the conditions according to Example 20. 6.5 g. of slightly yellow crystals with a melting point of 69–71° C. (capillary tube) are obtained. The yield is in the region of 54% (theoretical quantity=12 g.).

After being recrystallised twice, from alcohol and ether, the product is analytically pure.

M.P.=80–82° C. (capillary tube).

Gravimetric analysis.—Calculated: C, 57.41%; H, 6.88%; N, 3.18%. Found: C, 57.26%; H, 6.68%; N, 3.26%.

*Example 27.—N-beta-(ethoxypiperidine)-alpha-(1-naphthyl)-delta-hex-4-ene*

$$C_{23}H_{31}NO \qquad M=337.48$$

$$CH_3-CH=CH-CH_2-CH-CH_2-O-(CH_2)_2-N\diagup\diagdown$$

4 g. (0.10 mol=3.9 g.) of 95% sodium amide, 230 cc. of dry benzene and 23 g. (0.10 mol) of alpha-(1-naphthyl)-delta-hex-4-en-1-ol are heated under reflux for 1 hour. After cooling, 15 g. (0.10 mol=14.7 g.) of N-(beta-chloroethyl)-piperidine are added dropwise thereto.

The reaction mixture, treated in the usual manner, yields 21 g. of a yellow oil of amino odor and with a B.P.$_{0.544\ millibar}$=168–170° C.

The redistilled product is analytically pure and has the following constants:

B.P.$_{0.544\ millibar}$=158–160° C.
$n_d^{20}$=1.5688.

Gravimetric analysis.—Calculated: C, 81.87%; H, 9.26%; N, 4.15%. Found: C, 81.16%; H, 8.97%; N, 4.15%.

15

*Example 28.—N-(beta-ethoxypiperidine)-alpha-(1-naphthyl)-delta-hex-4-ene phosphate*

$C_{23}H_{34}NO_5P$   M=435.47

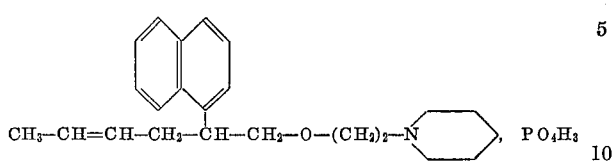

7 g. (0.062 mol=6.1 g.) of 85% orthophosphoric acid are added to a solution of 21 g. (0.062 mol) of N-(beta-ethoxypiperidino)-alpha-(1-naphthyl)-delta-hex-4-ene in 53 cc. of isopropane.

After standing overnight in a refrigerator, the white semi-solid mass is recovered from a layer of ether. The forming solid is centrifuged after several days in a refrigerator. When use is made of a crystal of the product for starting the crystallization, the latter takes place fairly quickly. There are obtained 23.5 g. of white crystals with a melting point of 108–110° C. (heating stage). The yield is about 84% (theoretical quantity=28 g.).

After being recrystallised twice from alcohol, followed by precipitation with ether, white crystals are obtained which have the following constants:

M.P.=112–114° C. (heating stage).

Acidity index: Calculated=257 (for 2 acid functions). Found=255.

Gravimetric analysis.—Calculated: C, 63.45%; H, 7.87%; N, 3.21%. Found: C, 62.77%; H, 7.33%; N, 3.29%.

*Example 29.—N-(beta-ethoxypyrrolidino)-alpha-(1-naphthyl)-delta-hex-4-ene*

$C_{22}H_{29}NO$   M=323.45

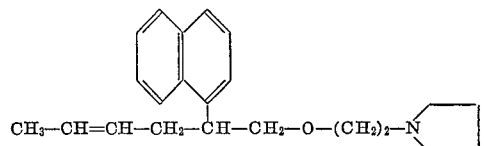

230 cc. of dry benzene, 4 g. (0.10 mol=3.9 g.) of 95% sodium amide and 23 g. (0.10 mol) of alpha-(1-naphthyl)-delta-hex-4-en-1-ol are heated under reflux for 1 hour. After cooling, 13.5 g. (0.10 mol=13.36 g.) of N-(beta-chloroethyl)-pyrrolidine are added thereto. Heating under reflux takes place for 16 hours and the usual treatment yields 18 g. of a viscous yellow liquid having an amino odor and the following constants:

B.P.$_{0.475 \text{ millibar}}$=162–164° C.
$n_d^{23}$=1.5695.

The yield is about 56% (theoretical quantity=32.3 g.).

*Example 30.—Acid oxalate of N-(beta-ethoxypyrrolidino)-alpha-(1-naphthyl)-delta-hex-4-ene*

$C_{24}H_{31}NO_5$   M=413.49

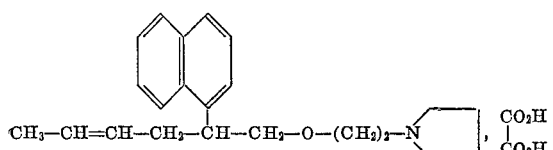

4.75 g. (0.0147 mol) of N-(beta-ethoxypyrrolidino)-alpha-(1-naphthyl)-delta-hex-4-ene and 2 cc. of acetone are added to a solution of 1.85 g. (0.0147 mol) of dihydrated oxalic acid in 12 cc. of acetone.

The reaction mixture, covered with a layer of hexane, crystallises quickly in a refrigerator. 5.5 g. of white crystals are obtained with a melting point of 100–103° C. (heating stage). The yield is 84% (theoretical quantity=6.6 g.).

16

After recrystallisation from alcohol, the melting point remains unchanged and the product has the following acidity index:

Acidity index: Calculated=270. Found=274.

Gravimetric analysis.—Calculated: C, 69.72%; H, 7.56%; N, 3.38%. Found: C, 69.61%; H, 7.57%; N, 3.57%.

*Example 31.—N-(beta-ethoxypyrrolidino)-alpha-(1-naphthyl)-delta-hex-4-ene methiodide*

$C_{23}H_{32}INO$   M=465.41

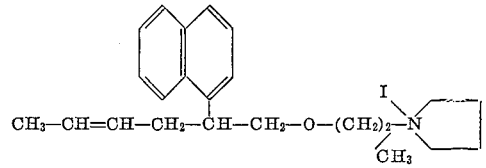

8 g. (0.0246 mol) of N-(beta-ethoxypyrrolidino)-alpha-(1-naphthyl)-delta-hex-4-ene in 8 cc. of alcohol are heated under reflux with 7.4 g. (0.05 mol) of methyl iodide for 15 minutes. The liquid is cooled to ambient temperature, covered with ether and left to stand overnight in a refrigerator. 9 g. of crystals with a melting point of 60–65° C. (heating stage) are obtained and the yield is 78% (theoretical quantity=11.5 g.).

After being recrystallised three times from alcohol, the white product is analytically pure and it mlets at 81–83° C. (heating stage).

Gravimetric analysis. — Calculated: C, 59.34%; H, 6.93%; N, 3.00%; I, 27.27%. Found: C, 59.22%; H, 6.74%; N, 2.96%; L, 27.35%.

It will be observed that the quantity of methyl iodide used is in an excess of 100% relatively to the stoichiometric quantity; otherwise, there is only obtained an oily product which does not crystallise.

*Example 32.—Alpha-(1-naphthyl)-delta-pent-4-en-1-ol*

$C_{15}H_{16}O$   M=212.28

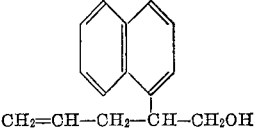

27.5 g. (0.114 mol) of methyl alpha-(1-naphthyl)-delta-pent-4-enoate in solution in 55 cc. of ether are introduced into a mixture of 4.5 g. (0.115 mol) of lithium-aluminium hydride and 500 cc. of dry ether. The period of addition lasts 30 minutes. Heating under reflux takes place for 4 hours. The decomposition of the complex is effected by adding 105 cc. of water and 195 cc. of 10% $H_2SO_4$.

Distillation yields 18.5 g. of an opaque liquid with a B.P.$_{0.815 \text{ millibar}}$=126–127° C. This yield is 76.5% (theoretical quantity=24.2 g.).

The redistilled product is analytically pure and has the following constants:

B.P.$_{0.544 \text{ millibar}}$=124–125° C.
$d_4^{25}$=1.045.
$n_d^{26}$=1.607.

Acidity index: Calculated=263. Found=260

Gravimetric analysis.—Calculated: C, 84.89%; H, 7.60%. Found: C, 84.44%; H, 7.62%.

*Example 33.—N-diethyaminoethoxy-alpha-(1-naphthyl)-delta-pent-4-ene*

$C_{21}H_{29}NO$   M=311.44

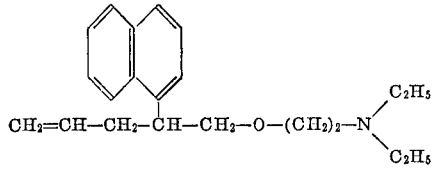

21 g. (0.10 mol) of alpha-(1-naphthyl)-delta-pent-4-en-1-ol are caused to react with 13.5 g. (0.10 mol) of beta-chloroethyl-N-diethylamine under the conditions of Example 32. Distillation yields 18 g. of a yellow liquid with an amino odor and a $B.P._{0.815 \text{ millibar}}$=138–140° C. The yield is 58% (theoretical quantity=31 g.).

The redistilled product has the following constants:

$B.P._{0.68 \text{ millibar}}$=132–133° C.
$d_4^{22}$=0.9916
$n_d^{23}$=1.5672

*Example 34.—Acid oxalate of N-diethylaminoethoxy-alpha-(1-naphthyl)-delta-pent-4-ene*

$C_{23}H_{31}NO_5$   M=401.48

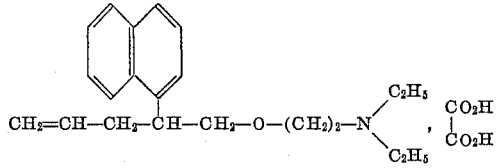

4.1 g. (0.032 mol) of dihydrated oxalic acid are dissolved while making tepid in 23 cc. of acetone and 10 g. (0.032 mol) of N-diethylaminoethoxy-(1-naphthyl)-delta-pent-4-ene are added dropwise to this solution. As soon as the addition is completed, the solution is heated under reflux for 5 minutes and, while still hot, it is transferred into a beaker and 10 cc. of hexane are added thereto.

The forming solid is centrifuged after a night in the refrigerator, it is dried in vacuo and there are obtained 9.5 g. of a white pasty product, the yield being 67% (theoretical quantity=14.1 g.).

After being recrystallised twice from ethyl acetate, the product is pure and has the following constants:

Melting point=57–58° C. (heating stage).
Acidity index: Calculated=278. Found=278.
Gravimetric analysis.—Calculated: C, 68.84%; H, 7.78%; N, 3.49%. Found: C, 68.72%; H, 7.92%; N, 3.66%.

*Example 35.—N-diethylaminoethoxy-alpha-(1-naphthyl)-delta-pent-4-ene phosphate*

$C_{21}H_{32}NO_5P$   M=409.43

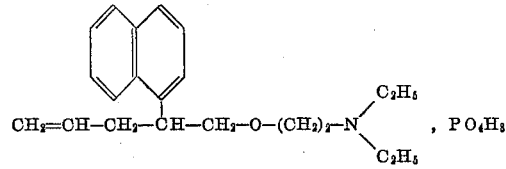

30 g. (0.096 mol) of alpha-(1-naphthyl)-diethylamino-ethoxy-delta-pent-4-ene are dissolved in 60 cc. of isopropanol and 10 g. (0.098 mol) of 85% orthophosphoric acid are added thereto. The mixture is treated as in Example 31. 24 g. of white crystals are obtained, these melting at 95–97° C. (heating stage). The yield is 60% (theoretical quantity=40 g.).

The product obtained is already pure, because after recrystallisation (alcohol-ether), the melting point remains unchanged.

Gravimetric analysis.—Calculated: C, 61.62%; H, 7.88%; N, 3.42%. Found: C, 61.76%; H, 8.01%; N, 3.51%.

What we claim is:

1. The acid oxalate of 2-diethylaminoethyl-$\beta$-(1-naphthyl)-$\beta'$-(2-tetrahydrofuryl)-isobutyrate.
2. The acid fumarate of 2-diethylaminoethyl-$\beta$-(1-naphthyl)-$\beta'$-(2-tetrahydrofuryl)-isobutyrate.
3. The acid oxalate of N-dimethylaminoethyl-$\beta$-(1-naphthyl)-$\beta'$-tetrahydrofuryl-isobutyrate.
4. The acid oxalate of N-piperidinoethyl-$\beta$-(1-naphthyl)-$\beta'$-(2-tetrahydrofuryl)-isobutyrate.
5. The acid oxalate of 2-morpholinoethyl-$\beta$-(1-naphthyl)-$\beta'$-(2-tetrahydrofuryl)-isobutyrate.
6. An acid salt of a compound of the formula

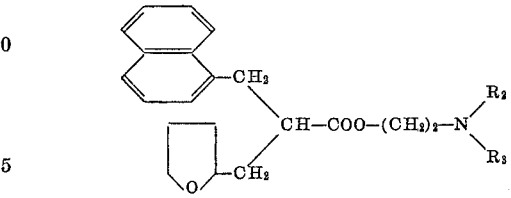

with an acid of the group consisting of oxalic, phosphoric or fumaric, wherein $R_2$ and $R_3$ are methyl, ethyl or with the adjacent nitrogen atom form piperidino or morpholino.

References Cited
UNITED STATES PATENTS

| | | | |
|---|---|---|---|
| 2,417,208 | 3/1947 | Martin et al. | 260—294.3 |
| 3,234,210 | 2/1966 | Schmidt et al. | 260—239 |
| 3,242,174 | 3/1966 | McManus et al. | 260—247.1 |

ALEX MAZEL, *Primary Examiner.*

J. TOVAR, *Assistant Examiner.*